(12) United States Patent
Bocchiola (10) Patent No.: US 7,589,986 B2
(45) Date of Patent: Sep. 15, 2009

(54) SINGLE STAGE INTEGRATED BOOST INVERTER MOTOR DRIVE CIRCUIT

(75) Inventor: Cesare Bocchiola, Milanese (IT)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/735,616

(22) Filed: Apr. 16, 2007

(65) Prior Publication Data

US 2007/0247123 A1    Oct. 25, 2007

Related U.S. Application Data

(60) Provisional application No. 60/793,094, filed on Apr. 19, 2006.

(51) Int. Cl.
*H02M 7/5387* (2007.01)

(52) U.S. Cl. .................. 363/98; 323/222; 363/132

(58) Field of Classification Search .......... 363/98, 363/132, 40, 41, 89, 95, 131; 323/222, 225, 323/267, 268, 271
See application file for complete search history.

(56) References Cited

U.S. PATENT DOCUMENTS

| | | | |
|---|---|---|---|
| 4,666,020 A | | 5/1987 | Watanabe |
| 5,305,191 A * | | 4/1994 | Loftus, Jr. ............... 363/17 |
| 5,345,156 A | | 9/1994 | Moreira |
| 5,373,195 A | | 12/1994 | De Doncker et al. |
| 5,432,695 A | | 7/1995 | Vlatkovic et al. |
| 5,510,974 A * | | 4/1996 | Gu et al. ............... 363/134 |
| 5,574,636 A | | 11/1996 | Lee et al. |
| 5,589,743 A | | 12/1996 | King |
| 5,710,699 A | | 1/1998 | King et al. |
| 5,712,536 A * | | 1/1998 | Haas et al. ............... 315/247 |
| 5,717,584 A * | | 2/1998 | Rajashekara et al. ........ 363/98 |
| 5,822,198 A * | | 10/1998 | Fraidlin et al. ........... 363/17 |
| 5,912,812 A * | | 6/1999 | Moriarty, Jr. ............ 363/89 |
| 6,026,006 A * | | 2/2000 | Jiang et al. ............. 363/132 |
| 6,060,859 A | | 5/2000 | Jonokuchi |
| 6,064,580 A * | | 5/2000 | Watanabe et al. .......... 363/17 |
| 6,069,809 A * | | 5/2000 | Inoshita ............... 363/98 |
| 6,337,801 B2 * | | 1/2002 | Li et al. ............... 363/127 |
| 6,737,822 B2 | | 5/2004 | King |
| 6,985,034 B1 * | | 1/2006 | Prokin et al. ........... 330/251 |
| 7,307,474 B2 * | | 12/2007 | Nguyen ............... 330/207 A |
| 2005/0062453 A1 | | 3/2005 | Sato |
| 2006/0250105 A1 | | 11/2006 | Jadric et al. |

* cited by examiner

*Primary Examiner*—Akm E Ullah
*Assistant Examiner*—Harry Behm
(74) *Attorney, Agent, or Firm*—Farjami & Farjami LLP (57) ABSTRACT

An integrated boost inverter circuit including at least one inverter stage having series connected high- and low-side switches having a common node. Each switch having an anti-parallel connected diode connected across the switch, which diode can be an external diode or an internal body diode of the switch; at least one inductor connectable in series between a voltage source and the node of the at least one inverter stage; a bulk capacitor connected across the at least one inverter stage; and a load being connectable to the node of the at least one inverter stage, wherein at every switching cycle, when the low-side switch of the at least one inverter stage turns-ON the respective at least one inductor is charged and when the low-side switch turns-OFF, the current in the respective at least one inductor re-circulates through the anti-parallel connected diode of the high-side switch into the bulk capacitor.

10 Claims, 11 Drawing Sheets

SINGLE STAGE INTEGRATED BOOST INVERTER MOTOR DRIVE CIRCUIT

CROSS-REFERENCE TO RELATED APPLICATIONS

This application is based on and claims priority to U.S. Provisional Patent Application Ser. No. 60/793,094, filed on Apr. 19, 2006 and entitled SINGLE STAGE INTEGRATED BOOST INVERTER MOTOR DRIVE CIRCUIT, the entire contents of which are hereby incorporated by reference herein.

BACKGROUND OF THE INVENTION

The present invention relates to variable speed inverter drive circuits and more particularly to inverter drive circuits integrated with a boost converter.

Increasingly, variable speed inverter drive circuits are used in the automotive environment. A number of electrical payloads, which a car battery must feed is increasing with every new car model that is put on the market. It is understood that demand for increased battery power will, in the medium term, oblige most car manufacturers to move from a present 12V battery architecture to higher battery voltages, e.g., 42V, or to a dual battery architecture.

In the meanwhile, the 12V battery must satisfy this increasing demand of electrical loads. Within these electrical loads, variable speed motors play a major role, including, as an example, car air conditioning compressor and fan motors, and, in high end vehicles, the compressor for an on-board refrigerator that may be used, for example, to cool down beverages. Another example of an electrical load is a big electrical motor driven compressor, e.g., in a refrigerated truck that is used to cool down a cabin in which delicate foods are transported. Such motors are typically brushless permanent magnet type motors with trapezoidal excitation.

Figure 1:
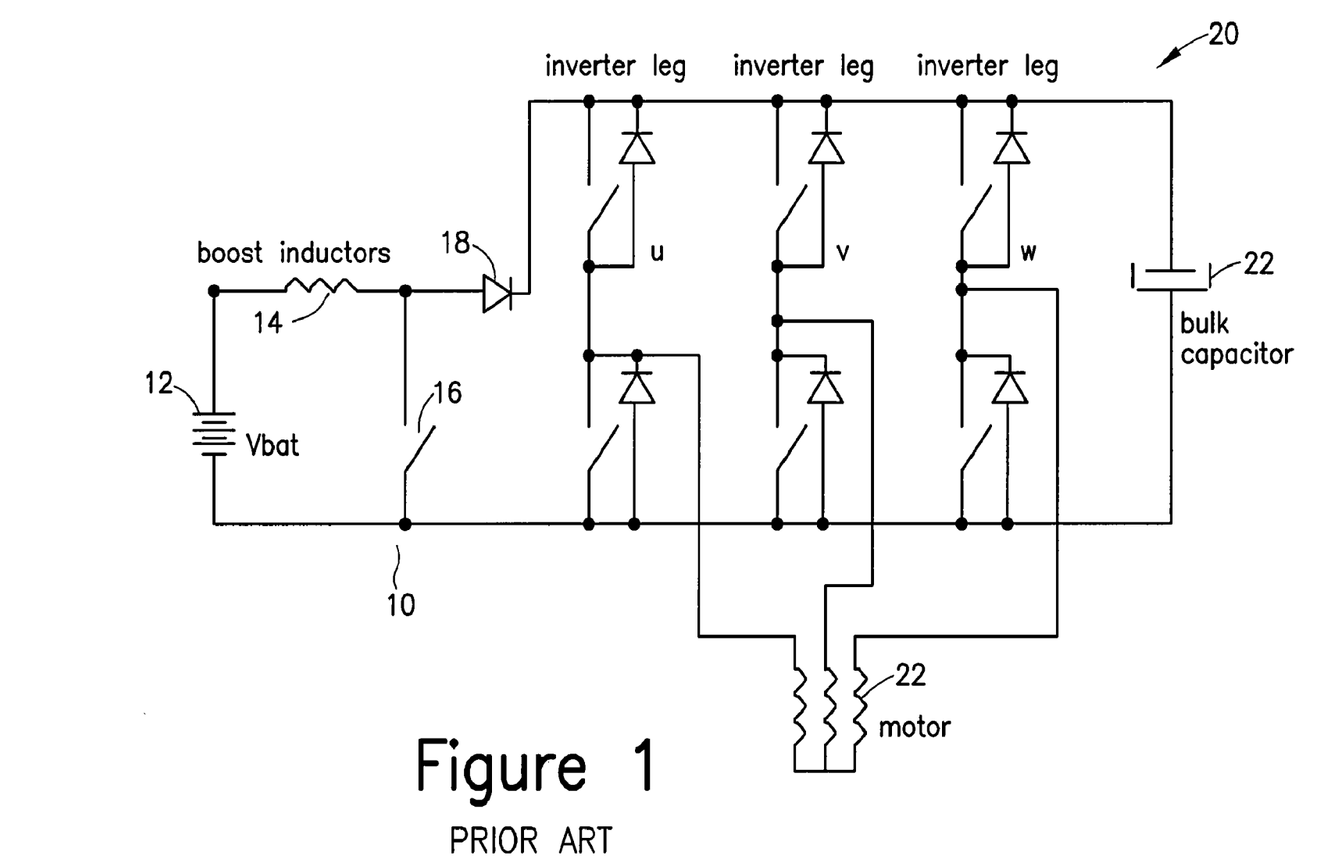
FIG. 1 is a diagram of a boost type converter interposed between a battery and an inverter having half bridge stages for feeding s three phase motor.

Since the power required by these motors often exceed a few hundreds of Watts, the motors cannot be designed to be directly fed by a battery voltage, i.e., through an inverter. That is because an otherwise excessive current would be drawn, and copper losses in the wiring and circuit components would be unacceptable. For that reason, as shown in FIG. 1, a boost converter 10 having a boost inductor 14, a diode 18, a switch 16, and a bulk capacitor 22 may be interposed between the battery 12 and the inverter 20 having half bridge stages U, V, W for feeding three phases of a motor 24. The motor 24 itself may run at 50-100V, which creates a much lower current stress on both the motor and the inverter switches.

Such boost converter is quite critical. Because its input voltage is low, cold battery's voltage can be as low as 8V, an input current is very high. This imposes the use of bulky and expensive semiconductors and passive components. For example, a 250 W motor would require a boost circuit able to handle an input current in excess of 30 A on average, and, perhaps, 35 A peak, depending on the ripple allowed on the input inductor which, in turn, affects the size and the power dissipation by magnetic losses of the inductor itself.

SUMMARY OF THE INVENTION

It is an object of the present invention to provide a circuit that integrates an inverter and a boost converter in a single stage.

Provided is an integrated boost inverter circuit including at least one inverter stage having series connected high- and low-side switches having a common node. Each switch having an anti-parallel connected diode connected across the switch, which diode can be an external diode or an internal body diode of the switch; at least one inductor connectable in series between a voltage source and the node of the at least one inverter stage; a bulk capacitor connected across the at least one inverter stage; and a load being connectable to the node of the at least one inverter stage, wherein at every switching cycle, when the low-side switch of the at least one inverter stage turns-ON the respective at least one inductor is charged and when the low-side switch turns-OFF, the current in the respective at least one inductor re-circulates through the anti-parallel connected diode of the high-side switch into the bulk capacitor.

Other features and advantages of the present invention will become apparent from the following description of the invention that refers to the accompanying drawings.

DETAILED DESCRIPTION OF EMBODIMENTS OF THE INVENTION

Figure 2:
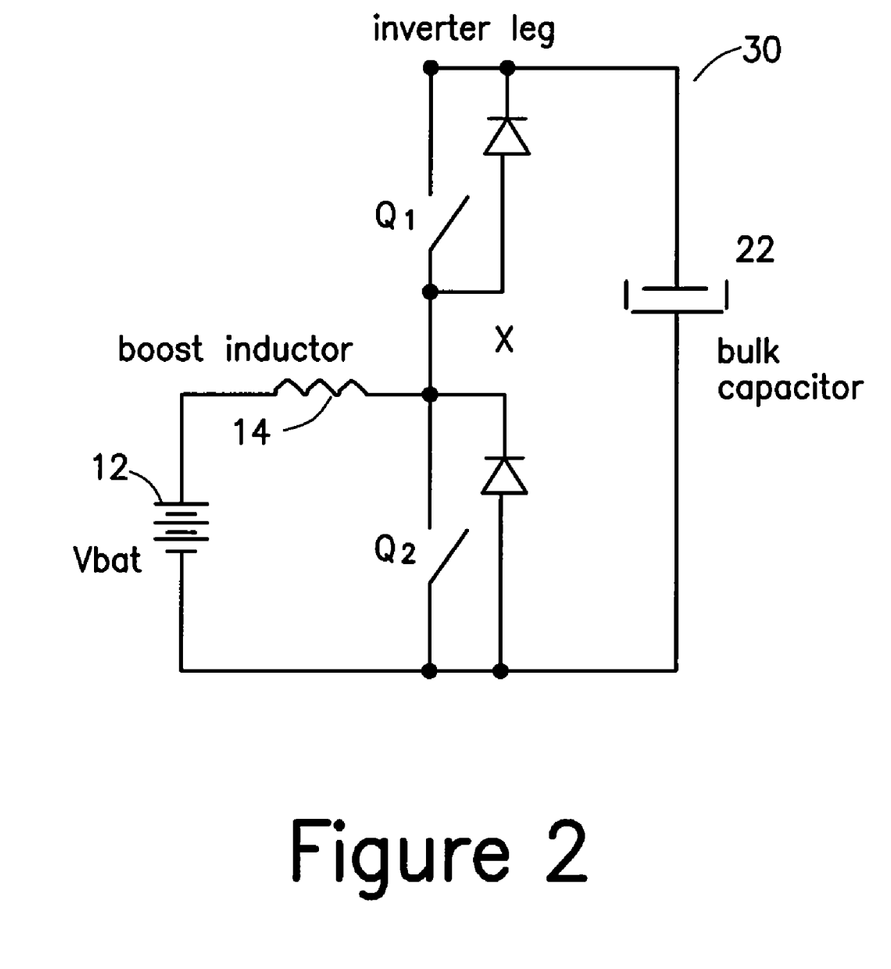
FIG. 2 is a diagram of a circuit that integrates a boost converter and a single stage of an inverter.

FIG. 2 illustrates a circuit 30 that integrates a boost converter and an inverter and in a single stage X of the inverter. The present invention proposes to advantageously use the inverter switches Q1 and Q2 as a boost switch in case of the switch Q2 and a diode in case of the switch Q1. The example of the concept is shown for only one leg or stage of the inverter, which may include three or more phases.

Figure 3:
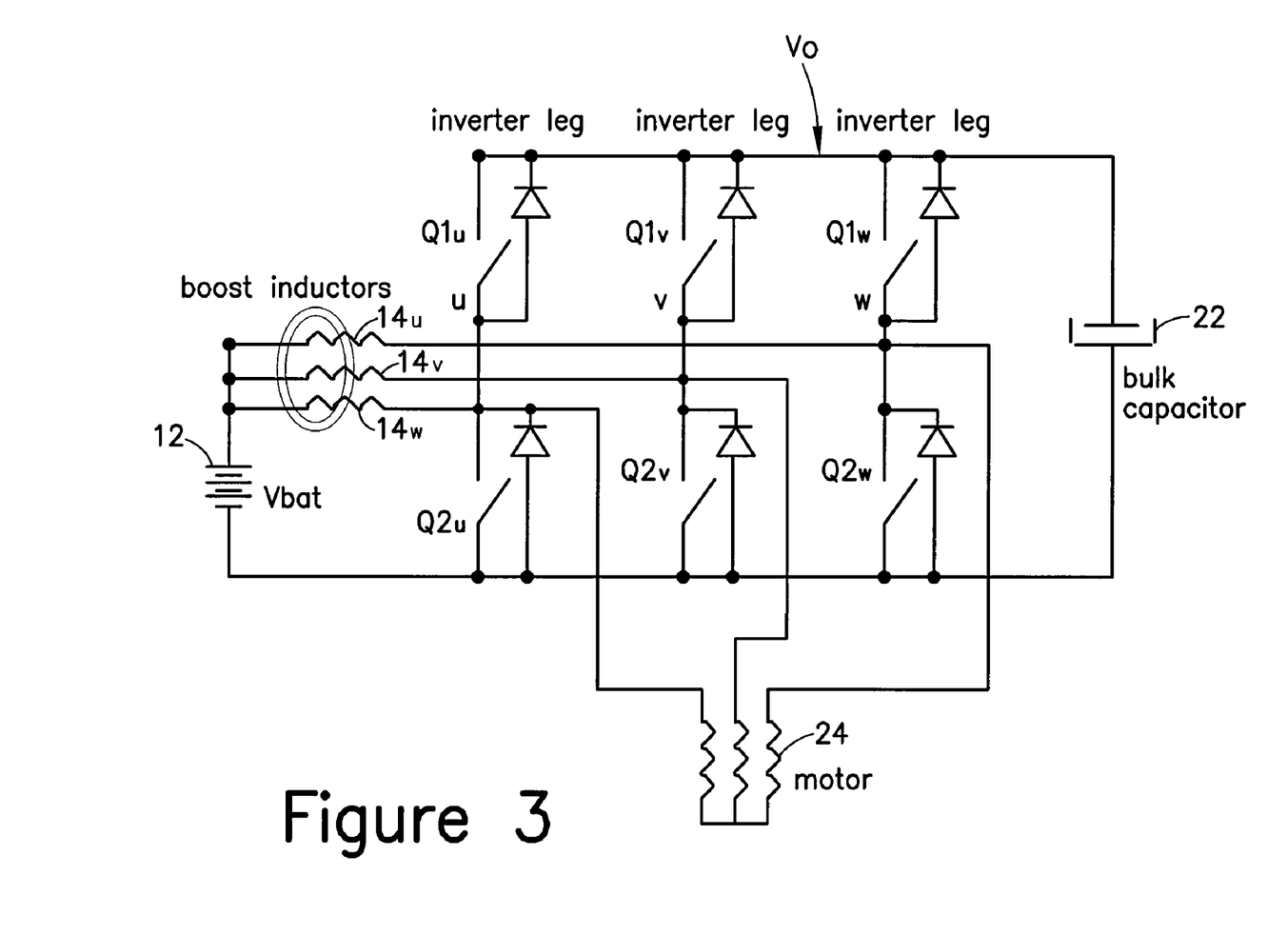
FIG. 3 is a diagram of a circuit having three parallel operated boost converters each including a stage connected to an input inductor.

Using only one leg, i.e., a single inverter stage, as a booster circuit requires oversizing the corresponding switches, and imposes severe limitations to the modulation strategy that is necessary to properly drive the motor. Thus, as illustrated in FIG. 3, it is useful to use all, or three legs/inverter stages U, V, and W, as parallel operated boost converters, in a way that the input current drawn by the battery 12 is shared by three separate circuits, each one comprising one inverter stage U, V, or W, plus an input inductor 14U, 14V, or 14W respectively.

Each boost circuit manages about one third of the total input power, thus, imposing much less added stress on the inverter switches, which also handle the motor phase currents.

A function of a poly-phase inverter in creating a rotational magnetic field in an electrical machine air gap and a behavior of a boost converter are well known and will not be described here, except as far as their interaction is concerned. Also, for the sake of completeness and clarity, several standard modulation strategies will be considered here, including simple square wave modulation and the most complex Space Vector PWM (SVM), as well as the standard sinusoidal modulation.

In a standard square wave modulation, each inverter stage of a motor is PWM modulated in a way that an average voltage at a central point or the node of the inverter stage connected to one of the motor's phases is a square wave of different, selectable amplitude. The complete modulation strategy is then to create three square wave voltages that are 120° phase shifted between each other and which appear at the motor's terminals.

Similarly, in a standard sinusoidal modulation, each leg or inverter stage of a motor is PWM modulated in a way that the average voltage at a central point or node of each 1 inverter stage is a sinusoidal voltage. Again, the complete PWM modulation strategy is then to create three sinusoidal voltages that are 120° phase shifted between each other and which appear at the motor's terminals. In both cases, a parameter known as Modulation Index (Mi), dictates a maximum duty cycle applied to a central point or node of each inverter stage. The duty cycle is constant and equal to Mi in square wave modulation at every instant.

In the SVM, modulation is slightly more complex, but the results are very similar. The central point of each inverter stage having an amplified sinusoid plus a small amount of third harmonic. The modulation of the switches of the stages in the present invention is not modified to serve the boost converter. Instead it is left exactly as required by the motor.

The voltage at the central point of each stage can be described, in an average sense, as the product of the DC voltage on the bulk capacitor Cbulk, and the following modulation functions:

a) for square wave modulation:

$$d1_z := 0.5 + 0.5 \cdot Mi \cdot \text{sign}(\sin(\omega m \cdot t_z)) \quad [1]$$
$$d2_z := 0.5 + 0.5 \cdot Mi \cdot \text{sign}\left(\sin\left(\omega m \cdot t_z + \frac{2}{3} \cdot \pi\right)\right)$$
$$d3_z := 0.5 + 0.5 \cdot Mi \cdot \text{sign}\left(\sin\left(\omega m \cdot t_z + \frac{4}{3} \cdot \pi\right)\right)$$

b) for sinusoidal modulation and SVM:

$$d1_z := 0.5 + 0.5 \cdot Mi \cdot \sin(\omega m \cdot t_z) \cdot 1.1546 + \quad [2]$$
$$0.1962 \cdot 0.5 \cdot Mi \cdot \sin(3 \cdot \omega m \cdot t_z)$$
$$d2_z := 0.5 + 0.5 \cdot Mi \cdot \sin\left(\omega m \cdot t_z + \frac{2}{3} \cdot \pi\right) \cdot 1.1546 +$$
$$0.1962 \cdot 0.5 \cdot Mi \cdot \sin(3 \cdot \omega m \cdot t_z)$$
$$d3_z := 0.5 + 0.5 \cdot Mi \cdot \sin\left(\omega m \cdot t_z + \frac{4}{3} \cdot \pi\right) \cdot 1.1546 +$$
$$0.1962 \cdot 0.5 \cdot Mi \cdot \sin(3 \cdot \omega m \cdot t_z)$$

Here, the coefficient 1.1546 and 0.1962 come from the equivalent effect performed by SVM. In case of purely sinusoidal modulation, the coefficient 1.1546 becomes 1 and the coefficient for the third harmonic becomes zero.

Referring to FIG. 3, every time a low side switch in the inverter Q2u, Q2v, or Q2w turn-ON, it also acts as a boost switch, by charging the corresponding boost inductor 14u, 14v, or 14w. When the switch is Q2u, Q2v, or Q2w turned-OFF, the current in the inductors re-circulates through the corresponding free-wheeling diode of the upper switch Q1u, Q1v, or Q1w, into the bulk capacitor Cbulk 22.

This occurs for each of the three legs or inverter stages U, V, or W, at every switching cycle. The actual output voltage, being common to the three booster circuits, will be:

$$Vo_z := \max(Vo1_z, Vo2_z, Vo3_z) \quad [3]$$

where $$Vo1_z := \frac{Vin}{1 - d1_z}; \quad Vo2_z := \frac{Vin}{1 - d2_z}; \quad Vo3_z := \frac{Vin}{1 - d3_z} \quad [4]$$

The three duty cycles in Equation [4] are the complement to Equation [1] of the modulation functions previously described. That is because the duty cycles of the low side switches are of interested here.

FIGS. 4 to 15 illustrate output voltage that results from applying the above-discussed modulation strategy to the three boost converters.

Figure 4:
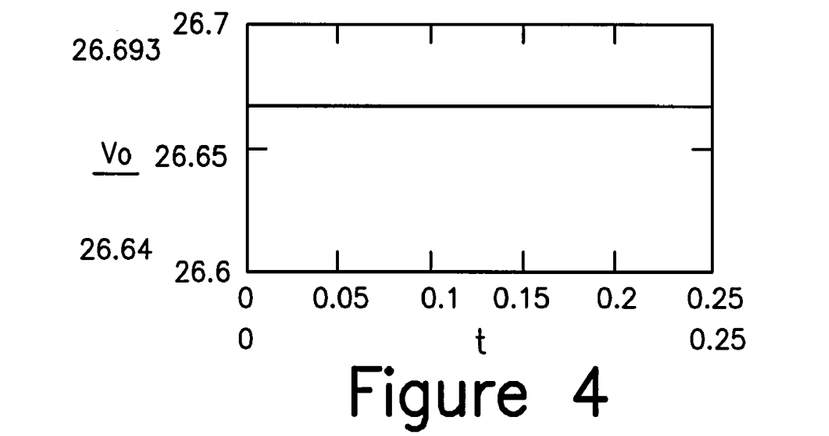
FIGS. 4, 5, and 6 are graphs of the actual voltage waveform for square wave modulation for Modulation Index of 10%, 50%, and 90% respectively.
Figure 5:
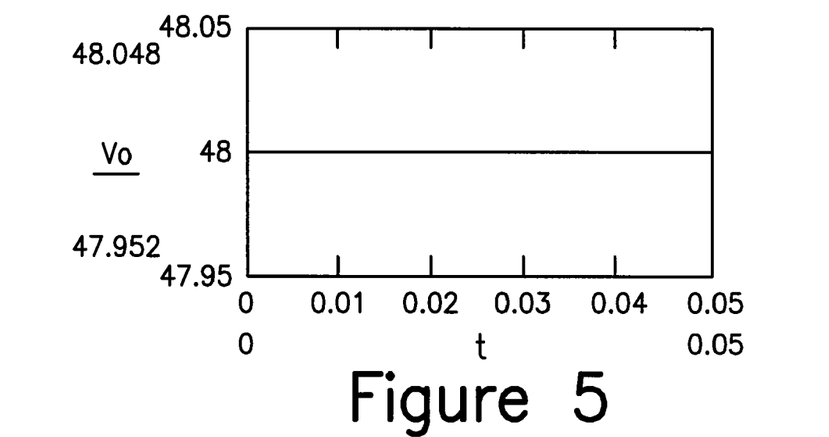
Figure 6:
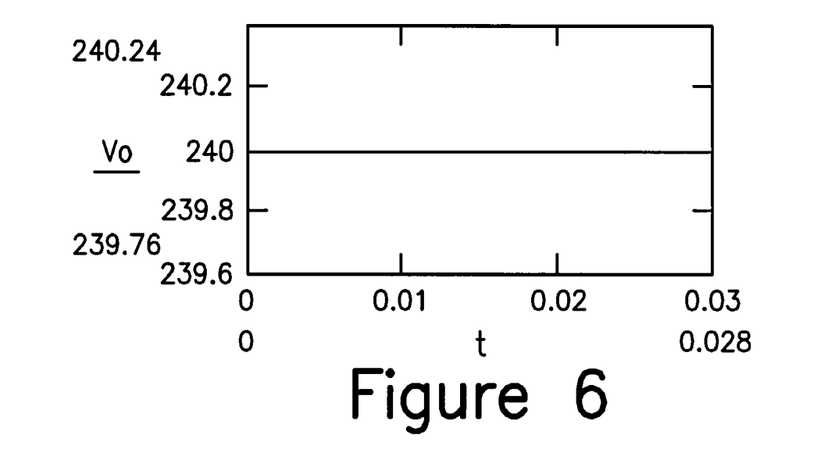
Figure 7:
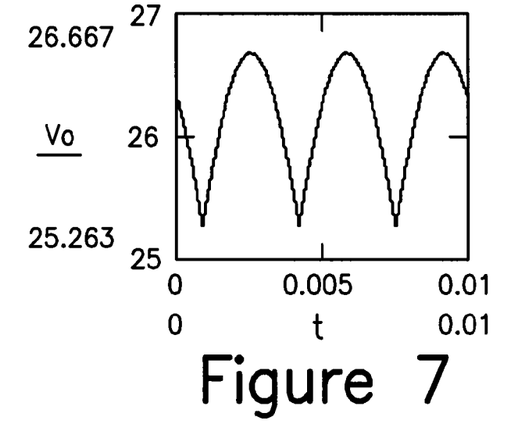
FIGS. 7, 8, and 9 are graphs of sinusoidal modulation for Modulation Index of 10%, 50%, and 90% respectively.
Figure 8:
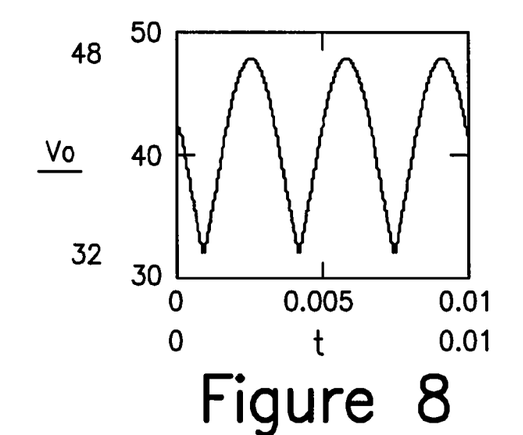
Figure 9:
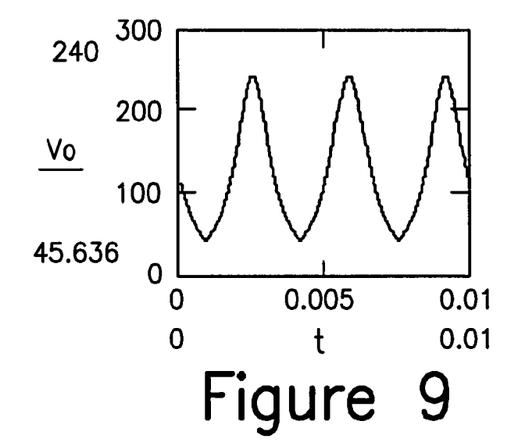
Figure 10:
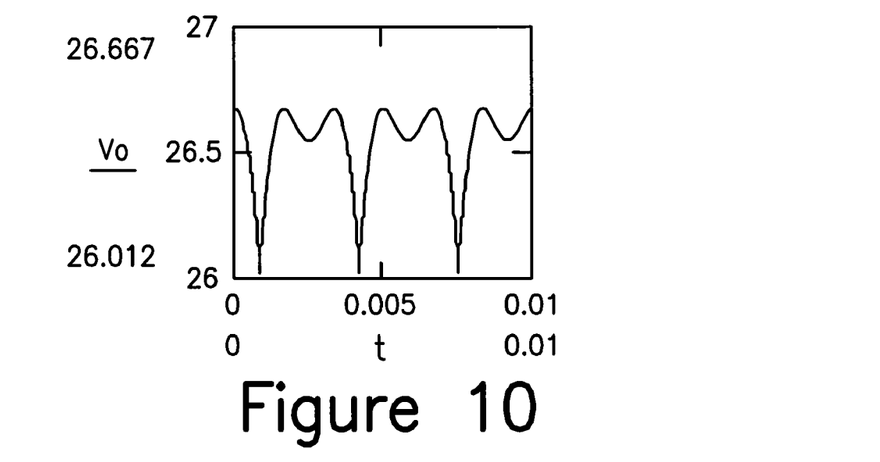
FIGS. 10, 11, and 12 are graphs of Space Vector PWM for Modulation Index of 10%, 50%, and 90% respectively.
Figure 11:
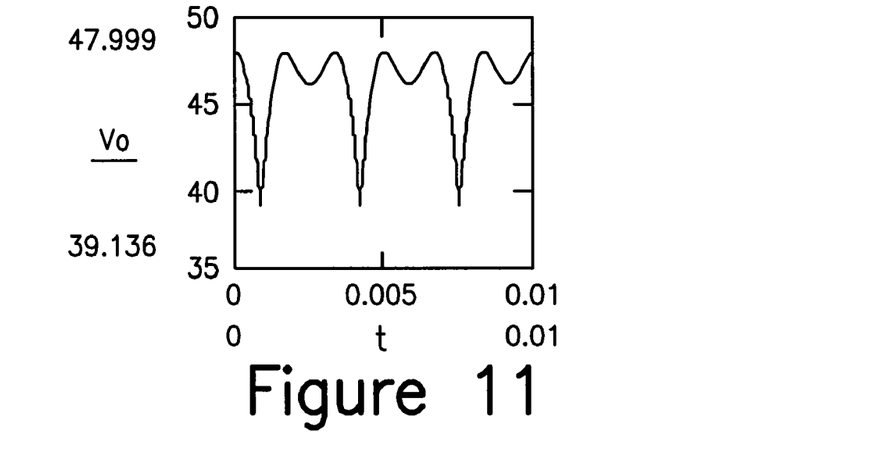
Figure 12:
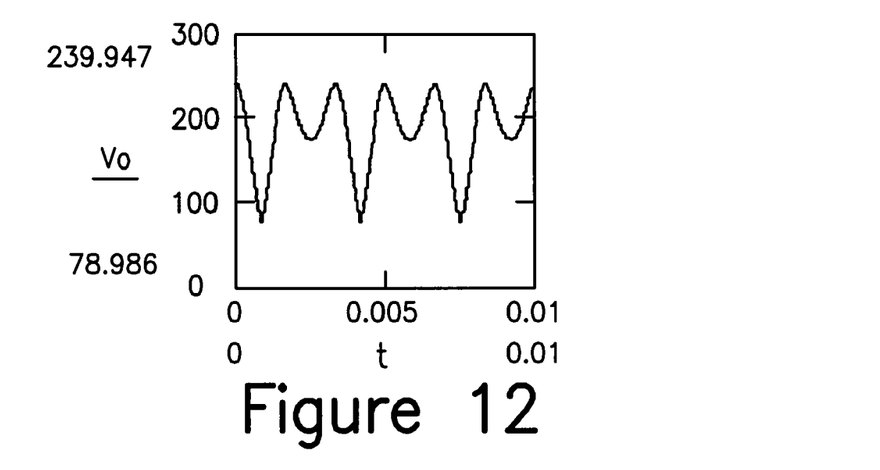
Figure 13:
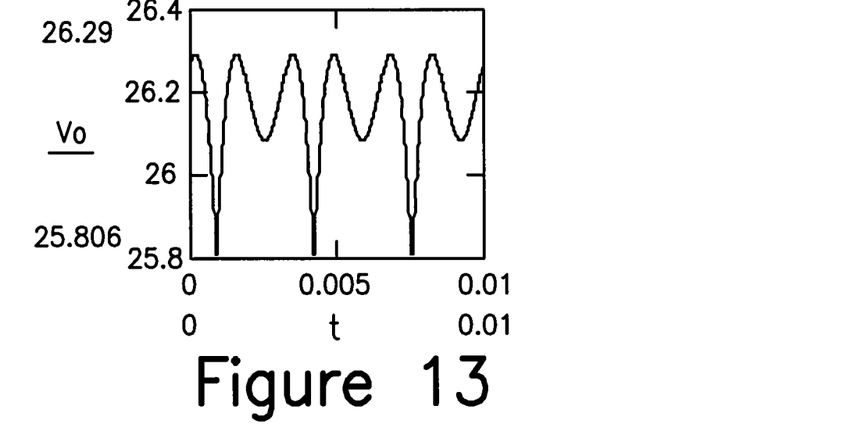
FIGS. 13, 14, and 15 are graphs of a special modulation of the present invention for Modulation Index of 10%, 50%, and 90% respectively.
Figure 14:
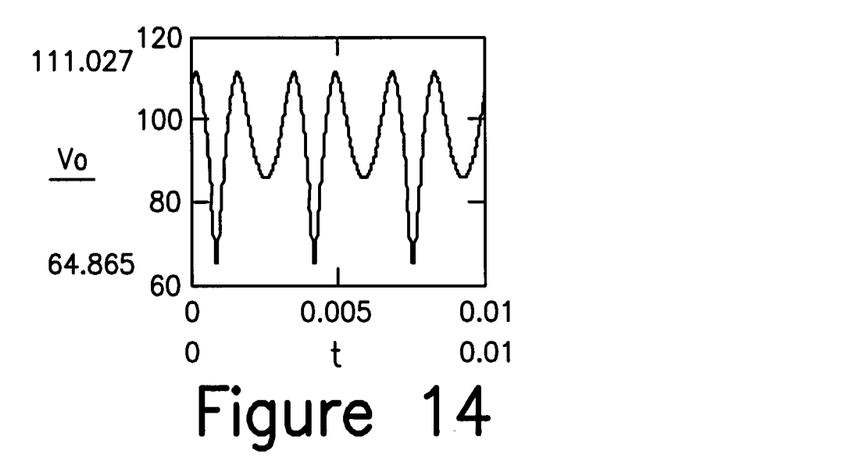
Figure 15:
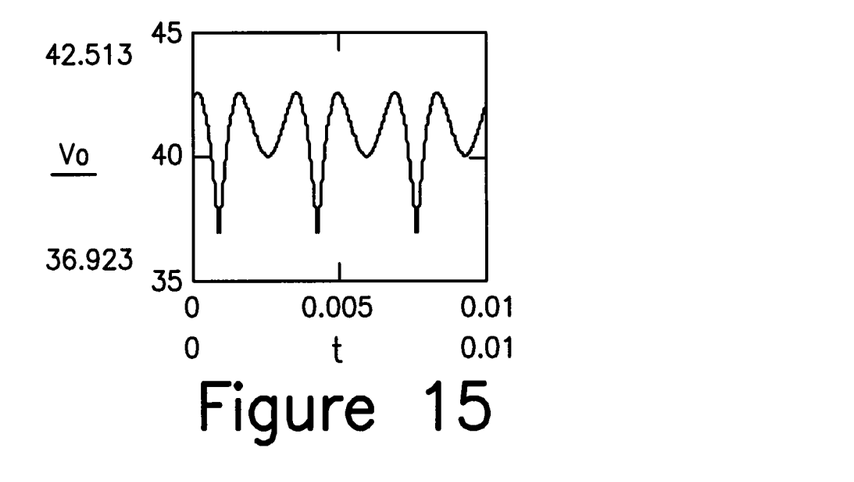

FIGS. 4, 5, and 6 show the actual voltage waveform for square wave modulation; FIGS. 7, 8, and 9 show sinusoidal modulation; FIGS. 10, 11, and 12 show the SVM; and FIGS. 13, 14, and 15 show a special modulation which is part of the present invention, for Mi ranging from 10% to 50% to 90%.

As shown, the square wave modulation applied to the boost converters generates no ripple across the output capacitor, while sinusoidal modulation or SVM generates quite high ripple.

Similar results, with respect to square wave modulation can also be achieved with 120° ON modulation. This modulation is mostly used with trapezoidal BEMF permanent magnet motors. This ripple is less pronounced if a proper, i.e., improved, modulation is implemented. The improved modulation described here is a pure sinusoid with 20% third harmonic injection. The improved modulation can be described by the following modulation functions:

$$d1_z := 0.5 + 0.5 \cdot Mi \cdot \sin(\omega m \cdot t_z) \cdot 1 + 0.2 \cdot 0.5 \cdot Mi \cdot \sin(3 \cdot \omega m \cdot t_z) \quad [5]$$
$$d2_z :=$$
$$0.5 + 0.5 \cdot Mi \cdot \sin\left(\omega m \cdot t_z + \frac{2}{3} \cdot \pi\right) \cdot 1 + 0.2 \cdot 0.5 \cdot Mi \cdot \sin(3 \cdot \omega m \cdot t_z)$$
$$d3_z := 0.5 + 0.5 \cdot Mi \cdot \sin\left(\omega m \cdot t_z + \frac{4}{3} \cdot \pi\right) \cdot 1 +$$
$$0.2 \cdot 0.5 \cdot Mi \cdot \sin(3 \cdot \omega m \cdot t_z)$$

It is important to note that, in variable speed drives, the voltage across the bulk capacitor Cbulk is usually kept fixed, and Mi is changed as a function of a desired speed. A lower speed usually requires less voltage applied to the motor, hence lower value for Mi. A higher speed requires higher voltage, hence higher value for Mi.

In the embodiment of the present invention, voltage across the bulk capacitor Cbulk automatically increases with increased Mi. Thus, the "boost" action is increased when it is advantageous to increase it. This, of course, means that the voltage applied to the motor is not a linear function of Mi, because Mi has double effect in increasing voltage across the bulk capacitor Cbulk and average voltage across the motor. This reduces the range of Mi values to drive the motor in a certain speed range and will mostly have the benefit of reducing switching losses across the switches. The switches' losses are roughly proportional to the voltage across the bulk capacitor Cbulk. In situations where the motor is running at low speeds, Mi will be low. Similarly, voltage Vcbulk across the bulk capacitor will be low. Also, switching losses will be low.

A slight drawback arises in a case of sinusoidal modulation or SVM. This is due to the ripple across the bulk capacitor Cbulk. Switches having slightly higher voltage rating, e.g., roughly 50% more than with a standard boost stage, will be needed.

The above discussion does not take into account the effect of the ripple across the bulk capacitor Cbulk. This ripple, influences the current drawn by the three boost converters, which, in turn, affects the ripple itself.

Figure 16:
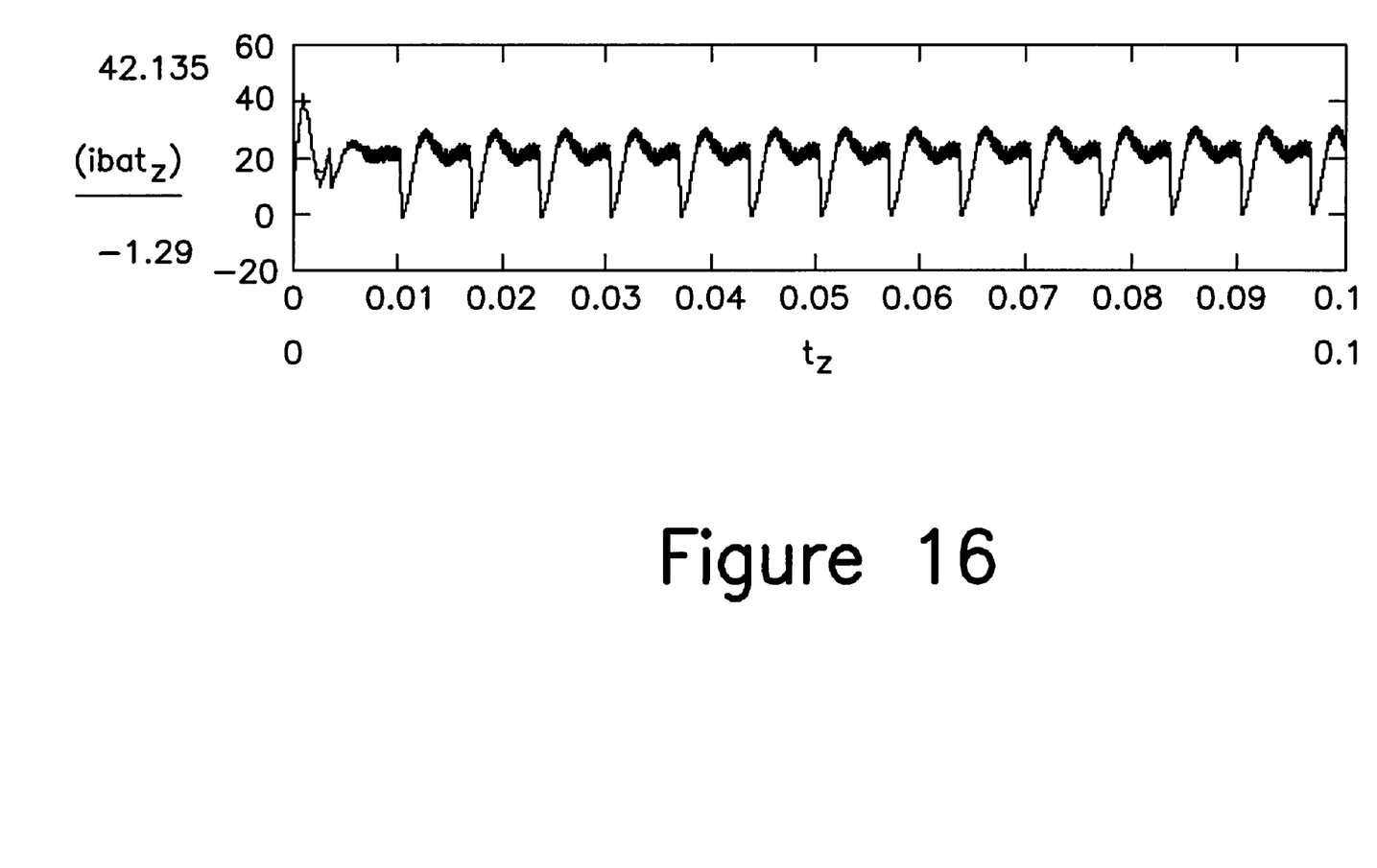
FIGS. 16, 17, and 18 are graphs showing voltage across a bulk capacitor Cbulk, battery current, and currents in three boost inductors for square wave modulation, where Modulation Index is 0.5.
Figure 17:
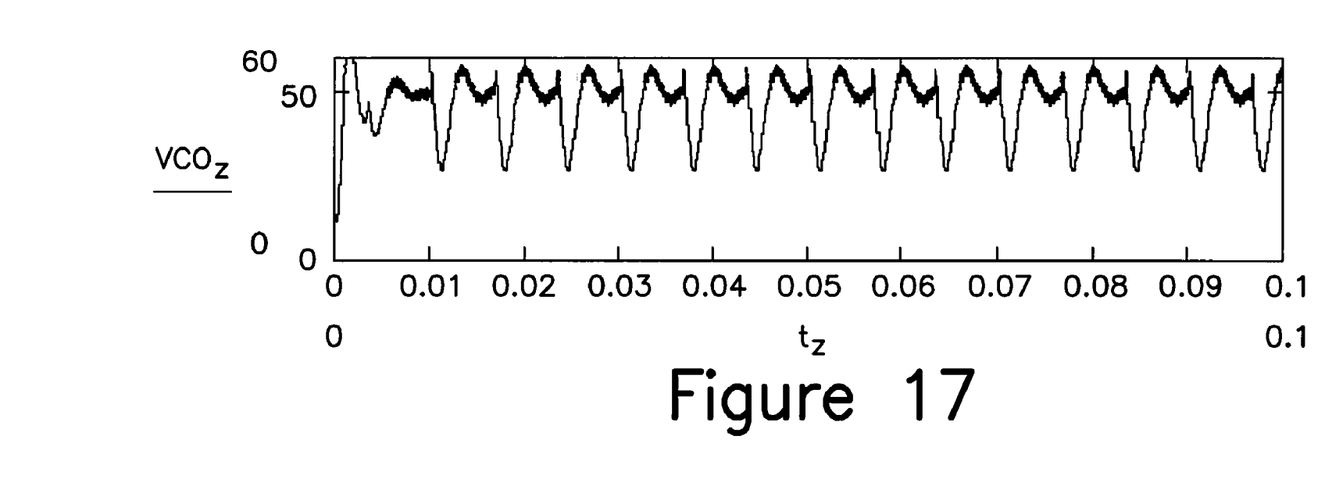
Figure 18:
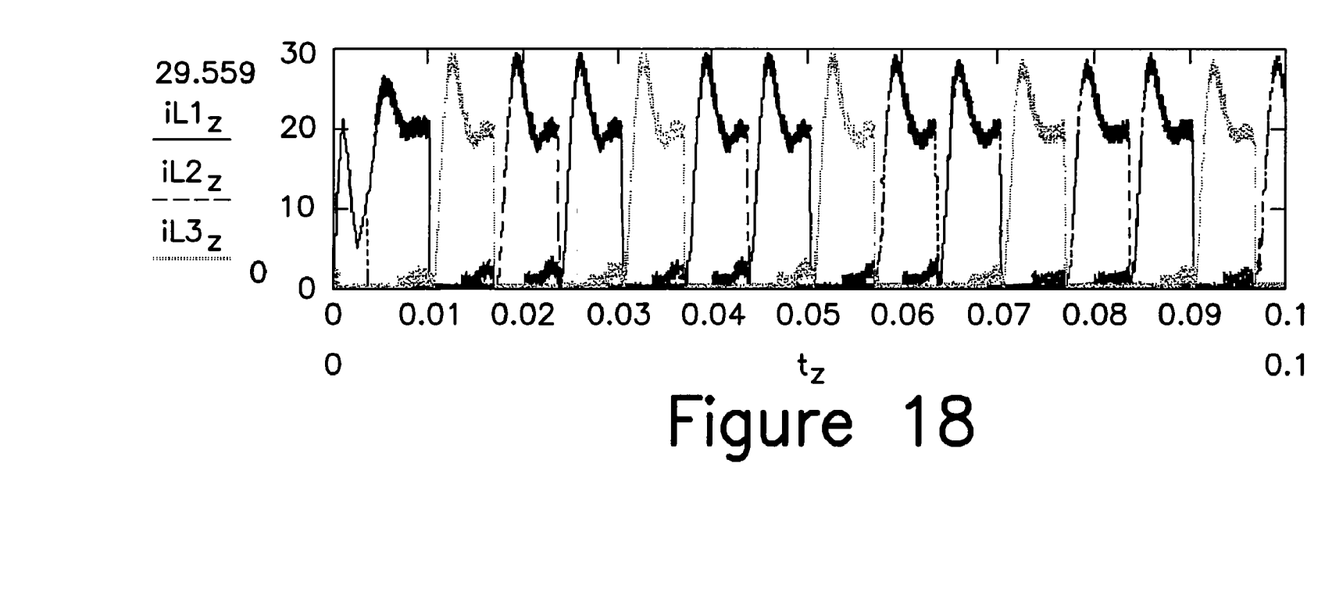

FIGS. 16, 17, and 18 show voltage across the bulk capacitor Cbulk, the battery current, and the currents in the three boost inductors respectively. Square wave modulation, where Mi=0.5 is used. Here, a 12V battery with 250 W load drawn at Mi=0.5 and a motor's electrical frequency of 50 Hz (3000 rpm for a 2 pole motor) is considered for illustrative purposes only, without loss of generality. Input inductors are 250 uH each and the output capacitor Cbulk=1000 uF. Switching frequency is 20 kHz.

Figure 19:
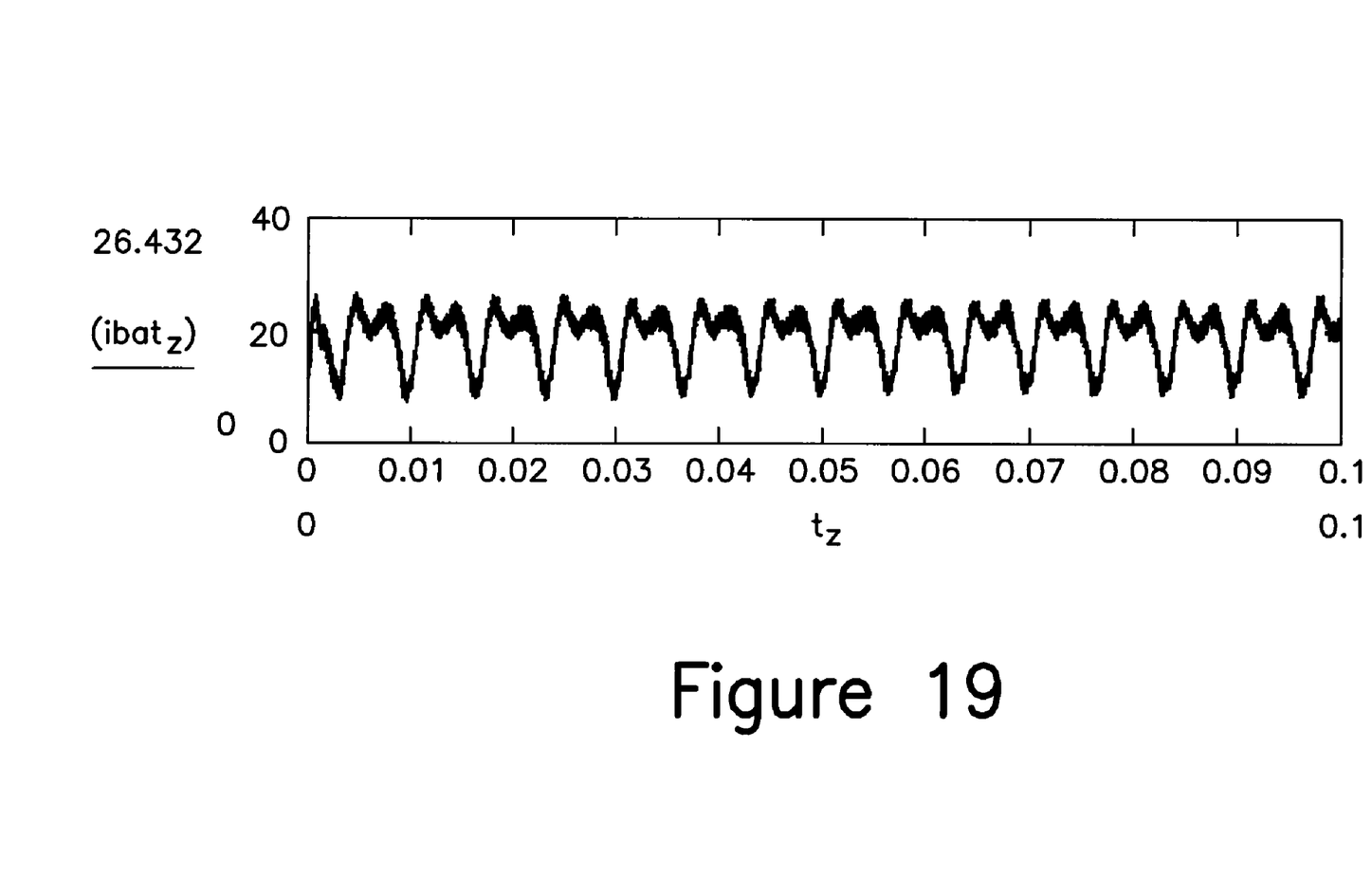
FIGS. 19, 20, and 21 are graphs showing results of the improved sinusoidal pattern of the present invention.
Figure 20:
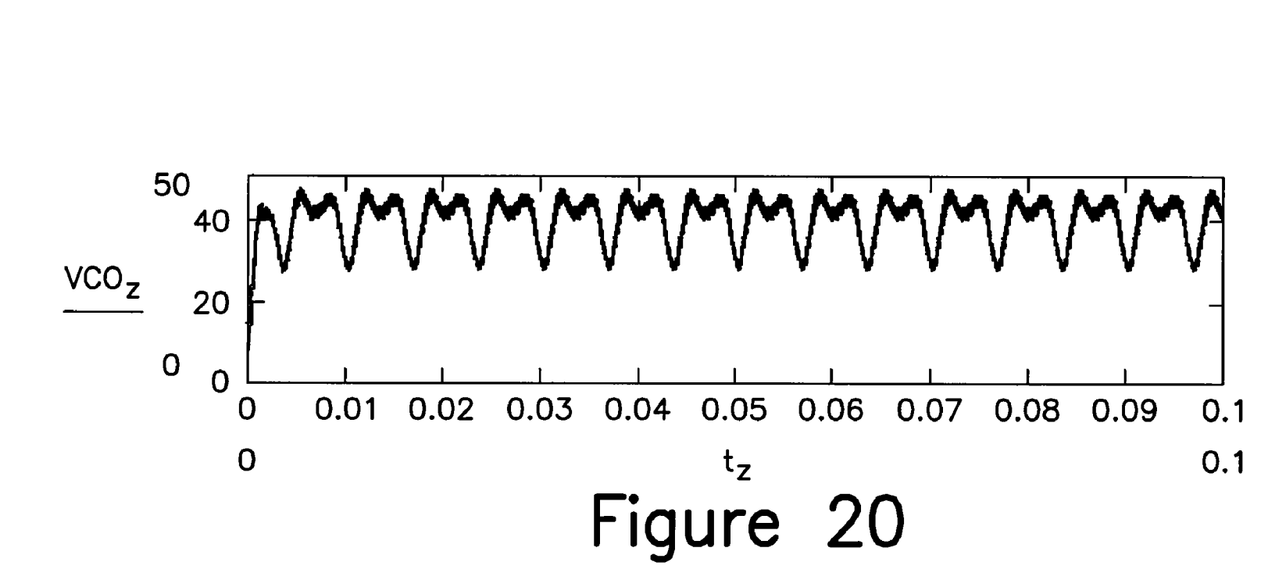
Figure 21:
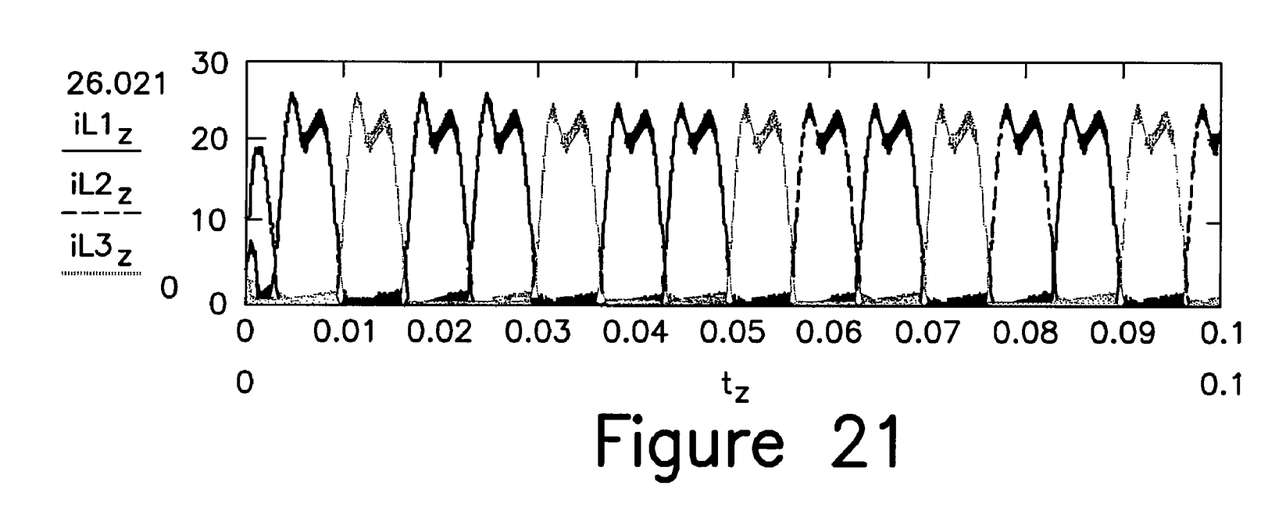

FIGS. 19, 20, and 21 illustrate results of the improved sinusoidal pattern. Both the battery and the inductors current, show peak values below 1.5×average. As expected, the result is improved, peak current is now only less than 30% above average. Thus, the proposed improved sinusoidal modulation works well for Mi up to 50-60%.

It may be shown that, at higher Mi, SVM or even square modulation offer better results. In the proposed example, SVM modulation at Mi=90% provides stable voltage at the output capacitor Cbulk and peak/average ratio of battery/inductors current that is less than 1.8. With square wave modulation, same voltage at the output capacitor Cbulk can be achieved at lower Mi (a bit more than 80%) and peak/average ratio of battery/inductors current doesn't exceed 1.2.

As illustrated in FIG. 3, three inductors are needed. Also, as can be seen from FIGS. 18 and 21, a single core can be used, and the three boost inductors simply are three windings wound on the same magnetic core. This is another important advantage and saving of the present invention.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. An integrated boost inverter circuit comprising:
   three parallel connected inverter stages, each inverter stage comprising
      series connected high- and low-side switches each having a respective common node, each switch having an anti-parallel connected diode connected across the switch, which diode can be an external diode or an internal body diode of the switch; and
      a respective inductor connected in series between a voltage source and the respective common node of a respective inverter stage and directly connected to the respective common node;
   a bulk capacitor connected across the three inverter stages and being charged with input current from the voltage source that flows only through the respective inductor of each of the three inverter stages; and
   a load connection for a three phase motor with each phase connectable to the respective common node of the respective inverter stage, the three inverter stages being controlled to commutate the three phase motor and sharing the input current drawn from the voltage source,
   wherein at every switching cycle, when the low-side switch of an inverter stage turns-ON the respective inductor is charged and when the low-side switch turns-OFF, the current in the respective inductor re-circulates through the anti-parallel connected diode of the high-side switch into the bulk capacitor;
   wherein an output voltage is common to the three inverter stages and is calculated in accordance with $Vo_z := \max(Vo1_z, Vo2_z, Vo3_z)$, where $$Vo1_z := \frac{Vin}{1-d1_z}; \quad Vo2_z := \frac{Vin}{1-d2_z}; \quad Vo3_z := \frac{Vin}{1-d3_z},$$

where d1, d2, and d3 are functions for calculating a modulation type selected from one of the square wave modulation, Space Vector PWM (SVM), and sinusoidal modulation;
   wherein three voltages of the selected modulation type are created and 120° phase shifted between each of the three inverter stages to appear at the motor's terminals, a constant modulation index (Mi) provides a maximum duty cycle for applying to the common node of each of the three inverter stages; and
   wherein when the SVM is selected, the at least one inverter stage is PWM modulated such that an average voltage at the common node of the at least one inverter stage is an amplified sinusoidal voltage plus a small amount of third harmonic.

2. The circuit of claim 1, wherein the modulation is 120° ON pure sinusoid modulation with 20% third harmonic injection used with trapezoidal BEMF permanent magnet motors.

3. The circuit of claim 2, wherein increases in Mi automatically effect increase in voltage across the bulk capacitor and average voltage across the motor and reduce switching losses across the high- and low-side switches.

4. An integrated boost inverter circuit comprising:
   three parallel connected inverter stages, each inverter stage comprising
      series connected high- and low-side switches each having a respective common node, each switch having an anti-parallel connected diode connected across the switch, which diode can be an external diode or an internal body diode of the switch; and
      a respective inductor connected in series between a voltage source and the respective common node of a respective inverter stage and directly connected to the respective common node;
   a bulk capacitor connected across the three inverter stages and being charged with input current from the voltage source that flows only through the respective inductor of each of the three inverter stages; and
   a load connection for a three phase motor with each phase connectable to the respective common node of the respective inverter stage, the three inverter stages being controlled to commutate the three phase motor and sharing the input current drawn from the voltage source,
   wherein at every switching cycle, when the low-side switch of an inverter stage turns-ON the respective inductor is charged and when the low-side switch turns-OFF, the current in the respective inductor re-circulates through the anti-parallel connected diode of the high-side switch into the bulk capacitor;

wherein an output voltage is common to the three inverter stages and is calculated in accordance with $$Vo_z := \max(Vo1_z, Vo2_z, Vo3_z), \text{ where } Vo1_z := \frac{Vin}{1-d1_z};$$

$$Vo2_z := \frac{Vin}{1-d2_z}; Vo3_z := \frac{Vin}{1-d3_z},$$

where d1, d2, and d3 are functions for calculating a modulation type selected from one of the square wave modulation, Space Vector PWM (SVM), and sinusoidal modulation;

wherein three voltages of the selected modulation type are created and 120° phase shifted between each of the three inverter stages to appear at the motor's terminals, a constant modulation index (Mi) provides a maximum duty cycle for applying to the common node of each of the three inverter stages; and wherein a voltage at the common node of the at least one inverter stage is a product of the DC voltage on the bulk capacitor and the modulation is calculated in accordance with $$d1_z := 0.5 + 0.5 \cdot Mi \cdot \text{sign}(\sin(\omega m \cdot t_z)),$$

$$d2_z := 0.5 + 0.5 \cdot Mi \cdot \text{sign}\left(\sin\left(\omega m \cdot t_z + \frac{2}{3} \cdot \pi\right)\right),$$

$$d3_z := 0.5 + 0.5 \cdot Mi \cdot \text{sign}\left(\sin\left(\omega m \cdot t_z + \frac{4}{3} \cdot \pi\right)\right)$$

for square wave modulation.

5. The circuit of claim 4, wherein each of the inverter stages manages about one third of the total input power.

6. The circuit of claim 5, wherein an added stress imposed on the respective high- and low-side switches controlling the motor phase currents is negligible.

7. The circuit of claim 4, wherein when the square wave modulation is selected, the at least one inverter stage is PWM modulated such that an average voltage at the common node of the at least one inverter stage is a square wave of a different, selectable amplitude.

8. The circuit of claim 4, wherein when the sinusoidal modulation is selected, the at least one inverter stage is PWM modulated such that an average voltage at the common node of the at least one inverter stage is a sinusoidal voltage.

9. An integrated boost inverter circuit comprising:

three parallel connected inverter stages, each inverter stage comprising series connected high- and low-side switches each having a respective common node, each switch having an anti-parallel connected diode connected across the switch, which diode can be an external diode or an internal body diode of the switch; and a respective inductor connected in series between a voltage source and the respective common node of a respective inverter stage and directly connected to the respective common node;

a bulk capacitor connected across the three inverter stages and being charged with input current from the voltage source that flows only through the respective inductor of each of the three inverter stages; and a load connection for a three phase motor with each phase connectable to the respective common node of the respective inverter stage, the three inverter stages being controlled to commutate the three phase motor and sharing the input current drawn from the voltage source, wherein at every switching cycle, when the low-side switch of an inverter stage turns-ON the respective inductor is charged and when the low-side switch turns-OFF, the current in the respective inductor re-circulates through the anti-parallel connected diode of the high-side switch into the bulk capacitor;

wherein an output voltage is common to the three inverter stages and is calculated in accordance with $$Vo_z := \max(Vo1_z, Vo2_z, Vo3_z), \text{ where } Vo1_z := \frac{Vin}{1-d1_z};$$

$$Vo2_z := \frac{Vin}{1-d2_z}; Vo3_z := \frac{Vin}{1-d3_z},$$

where d1, d2, and d3 are functions for calculating a modulation type selected from one of the square wave modulation, Space Vector PWM (SVM), and sinusoidal modulation;

wherein three voltages of the selected modulation type are created and 120° phase shifted between each of the three inverter stages to appear at the motor's terminals, a constant modulation index (Mi) provides a maximum duty cycle for applying to the common node of each of the three inverter stages; and wherein a voltage at the common node of the at least one inverter stage is a product of the DC voltage on the bulk capacitor and the modulation is calculated in accordance with $$d1_z := 0.5 + 0.5 \cdot Mi \cdot \sin(\omega m \cdot t_z) \cdot 1.1546 + 0.19620.5 \cdot Mi \cdot \sin(3 \cdot \omega m \cdot t_z),$$

$$d2_z := 0.5 + 0.5 \cdot Mi \cdot \sin\left(\omega m \cdot t_z + \frac{2}{3} \cdot \pi\right) \cdot 1.1546 + 0.19620.5 \cdot Mi \cdot \sin(3 \cdot \omega m \cdot t_z),$$

$$d3_z := 0.5 + 0.5 \cdot Mi \cdot \sin\left(\omega m \cdot t_z + \frac{4}{3} \cdot \pi\right) \cdot 1.1546 + 0.19620.5 \cdot Mi \cdot \sin(3 \cdot \omega m \cdot t_z),$$

for sinusoidal modulation and SVM, where 1.1546 and 0.1962 are coefficients from the equivalent effect performed by SVM, and in case of purely sinusoidal modulation, the coefficient 1.1546 becomes 1 and the coefficient for the third harmonic becomes zero.

10. An integrated boost inverter circuit comprising:

three parallel connected inverter stages, each inverter stage comprising series connected high- and low-side switches each having a respective common node, each switch having an anti-parallel connected diode connected across the switch, which diode can be an external diode or an internal body diode of the switch; and a respective inductor connected in series between a voltage source and the respective common node of a respective inverter stage and directly connected to the respective common node;

a bulk capacitor connected across the three inverter stages and being charged with input current from the voltage source that flows only through the respective inductor of each of the three inverter stages; and a load connection for a three phase motor with each phase connectable to the respective common node of the respective inverter stage, the three inverter stages being controlled to commutate the three phase motor and sharing the input current drawn from the voltage source, wherein at every switching cycle, when the low-side switch of an inverter stage turns-ON the respective inductor is charged and when the low-side switch turns-OFF, the current in the respective inductor re-circulates through the anti-parallel connected diode of the high-side switch into the bulk capacitor;

wherein an output voltage is common to the three inverter stages and is calculated in accordance with $$Vo_z := \max(Vo1_z, Vo2_z, Vo3_z), \text{ where } Vo1_z := \frac{Vin}{1-d1_z};$$

$$Vo2_z := \frac{Vin}{1-d2_z}; Vo3_z := \frac{Vin}{1-d3_z},$$

where d1, d2, and d3 are functions for calculating a modulation type selected from one of the square wave modulation, Space Vector PWM (SVM), and sinusoidal modulation;

wherein three voltages of the selected modulation type are created and 120° phase shifted between each of the three inverter stages to appear at the motor's terminals, a constant modulation index (Mi) provides a maximum duty cycle for applying to the common node of each of the three inverter stages; and wherein a voltage at the common node of the at least one inverter stage is a product of the DC voltage on the bulk capacitor and the modulation is calculated in accordance with $$d1_z := 0.5 + 0.5 \cdot Mi \cdot \sin(\omega m \cdot t_z) \cdot 1 + 0.2 \cdot 0.5 \cdot Mi \cdot \sin(3 \cdot \omega m \cdot t_z),$$

$$d2_z := 0.5 + 0.5 \cdot Mi \cdot \sin\left(\omega m \cdot t_z + \frac{2}{3} \cdot \pi\right) \cdot 1 + 0.2 \cdot 0.5 \cdot Mi \cdot \sin(3 \cdot \omega m \cdot t_z),$$

$$d3_z := 0.5 + 0.5 \cdot Mi \cdot \sin\left(\omega m \cdot t_z + \frac{4}{3} \cdot \pi\right) \cdot 1 + 0.2 \cdot 0.5 \cdot Mi \cdot \sin(3 \cdot \omega m \cdot t_z),$$

for an improved modulation.

* * * * *